United States Patent [19]

Torisawa

[11] 4,075,540
[45] Feb. 21, 1978

[54] STEPPING MOTOR FOR TIMEPIECE

[75] Inventor: Akira Torisawa, Machida, Japan

[73] Assignee: Kabushiki Kaisha Daini Seikosha, Japan

[21] Appl. No.: 705,441

[22] Filed: July 15, 1976

[30] Foreign Application Priority Data

July 15, 1975 Japan .................................. 50-87115
July 17, 1975 Japan .................................. 50-88022
July 18, 1975 Japan .................................. 50-881110

[51] Int. Cl.² .......................................... H02K 29/00
[52] U.S. Cl. .................................. 318/138; 58/23 D
[58] Field of Search ............... 318/254, 138, 696, 132; 58/23 D, 23 R

[56] References Cited

U.S. PATENT DOCUMENTS 3,497,782  2/1970  Petrides ................................. 318/138
3,665,271  5/1972  Assmus et al. ........................ 318/138

Primary Examiner—Herman Hohauser
Attorney, Agent, or Firm—Robert E. Burns; Emmanuel J. Lobato; Bruce L. Adams

[57] ABSTRACT

A stepping motor for a timepiece comprising one-piece upper stator pair, one-piece lower stator pair, and magnetic material between said one-piece upper stator and said one-piece lower stator and circular rotor having at least two pairs of magnetic poles positioned circumferentially thereof is disposed between the stator pairs, and a driving coil is connected magnetically to said one-piece upper stator pair and to said one-piece lower stator pair. The stepping motor includes means for defining a rest position of the rotor.

6 Claims, 13 Drawing Figures

STEPPING MOTOR FOR TIMEPIECE

BACKGROUND OF THE INVENTION

This invention relates to a stepping motor for timepiece and more particularly to improvements of the stator for the stepping motor.

The stator of the type known heretofor has been composed of an upper stator pair and a lower stator pair.

Therefore, the number the components is apt to be large whereby the assembly of the stepping motor is apt to be difficult.

Also, the above conventional stepping motor having a pair of upper stators and a pair of lower stators needs the stepping portion in these stators in order to determining the rest position of the rotor.

However, this method of defining the stepping portions on these stators has the disadvantage that the performance of the stepping motor goes down with deformity of a pair of the upper stators 1-a and 1-b as shown in FIG. 1 and a pair of the lower stators as not shown in Figure in case that the timepiece falls and damages the stators.

Also, the performance of the stepping motor goes down with the variation of the stepping portion caused from the deformity of a pair of upper stators when the timepiece is assembled.

Further, the rotational direction of the rotor is apt to change into the reverse direction with the variation of the stepping portion and the above deformity.

SUMMARY OF THE INVENTION

It is an object of the present invention to provide a stepping motor for a timepiece eliminating the above defects of the prior art.

It is another object of the present invention to provide the stepping motor for a timepiece having a one-piece upper stator and a one-piece lower stator.

It is still another object of the invention to provide the stepping motor having means for setting the rest position of the rotor.

The foregoing object and other objects as well as the characteristic features of the invention will become more apparent and more readily understandable by the following description and the appended claims when read in conjunction with the accompanying drawings.

BRIEF DESCRIPTION OF THE DRAWING

FIGS. 7b and 7c show the operational principle of the stepping motor of FIG. 7a.

DETAILED DESCRIPTION OF THE INVENTION

Figure 1:
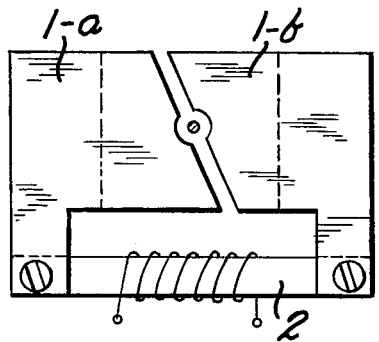
FIG. 1 is a plan view of the conventional pair of upper stators.
Figure 2:
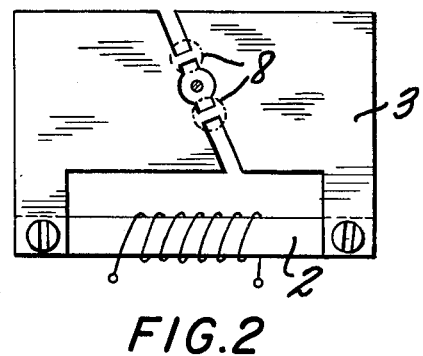
FIG. 2 is a plan view of the one-piece upper stator used for embodying this invention.
Figure 3:
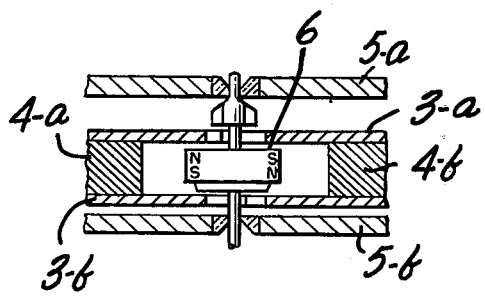
FIG. 3 is a cross-sectional view of the stepping motor in according to this invention.
Figure 4:
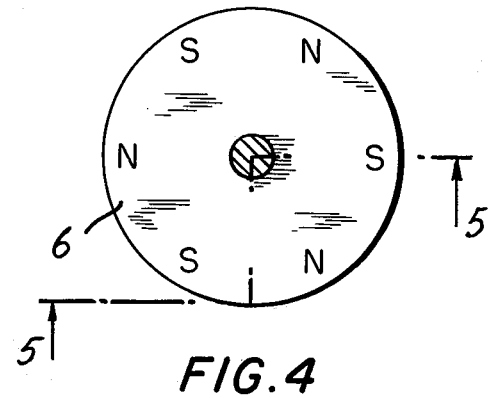
FIG. 4 is a plan view showing the upper side of the rotor.

Referring now to embodiments of the stepping motor's structure according to the present invention, FIG. 2 is a plan view of the one-piece upper stator used for embodying this invention and FIG. 3 shows the cross-sectional view of the stepping motor. And FIG. 4 is the plan view of the rotor 6 for stepping motor.

The stator 3 consists of the one-piece of material which has very narrow portions 8 narrow in width and which are designed to saturate magnetically with a little magnetic motive force when a current flows in the driving coil 2.

And since the permeability of the magnetic material is equal to that of the air after the magnetic saturation thereof, the one-piece stator operates as a two-piece stator, namely a pair of upper stators, magnetically.

The stator 3 is composed of the upper stator 3-a and the lower stator 3-b as shown in FIG. 3.

And the magnetic materials 4-a and 4-b are disposed between the one-piece upper stator 3-a and the one-piece lower stator 3-b.

And further, in the space between the one-piece upper stator 3-a, the one-piece lower stator 3-b and the magnetic materials 4-a, 4-b, the magnetized circular rotor 6 is disposed.

This rotor 6 is held in position with upper and lower bearings.

Also, the stator 3 having the one-piece upper stator 3-a and the one-piece stator 3b, and the driving coil are fixed to one another with a screw.

Therefore, the stator 3 is connected to the driving coil magnetically.

Next, the principle of operation of the stepping motor is described for the case of a 12-pole rotor.

Generally, the number of the magnetic pole of the rotor equals $8n-4$ ($n=1, 2, 3, ....$).

The angle between the gap line of the one-piece upper stator and the gap line of the one-piece lower stator is selected to correspond to the number of the rotor's magnetic pole.

Figure 5:
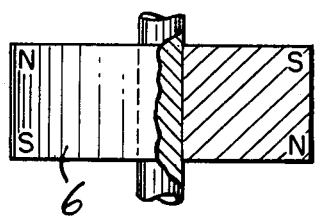
FIG. 5 is a cross-sectional view, partly in section along I—I of the rotor shown in FIG. 4.

The angle between the gap line of the one-piece upper and lower stators is 60° when the rotor has 4 magnetic poles in cross section as shown in FIG. 4 and FIG. 5.

Namely, FIG. 4 and FIG. 5 respectively are the plan view and the cross-sectional view showing the magnetized state of the rotor 6 used for embodying the stepping motor.

The rotor 6 having a circular shape is magnetized at the upper and the lower sides thereof in the axial direction of the rotor 6.

Figure 6:
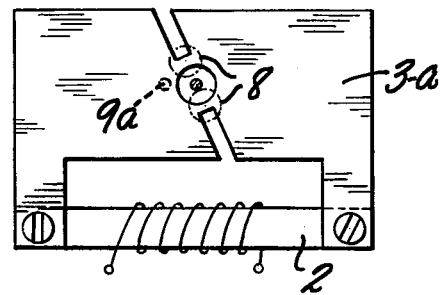
FIG. 6 is a plan view of another one-piece upper stator used for embodying this invention.

FIG. 6 shows the upper stator 3-a which is constructed with one piece of material and having the magnetic piece 9a.

The one-piece upper stator 3-a is designed so as to saturate magnetially at the portion 8 within the dotted line 8 with a little magnetomotive force of the driving coil.

Therefore, the permeability at the portion within the dotted line becomes equal to that of the air after the portion within the dotted line 8 of the one-piece upper stator 3 is saturated.

Consequently, the one-piece upper stator 3-a operates as the two-piece stator magnetically and this does not affect the performance of the stepping motor.

Figure 7A:
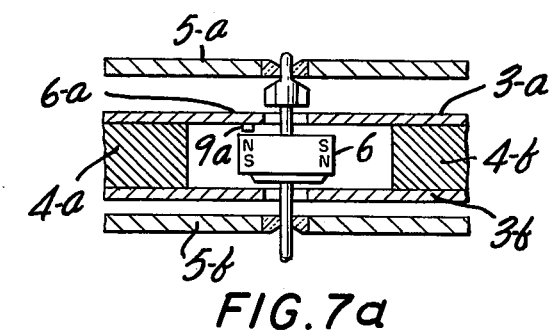
FIG. 7a is a cross-sectional view of the stepping motor using the one-piece upper stator as shown in FIG. 6.

FIG. 7a is the cross-sectional view of the stepping motor of this invention illustrated in FIG. 6.

The rotor 6 is held in position by the bearing 5 in the space between the one-piece upper stator 3-a, the one-piece lower stator 3-b, and the magnetic materials 4-a and 4-b.

Next, the principle of operation of the stepping motor of this invention is described for the case of a 12-pole rotor.

Figure 7B:
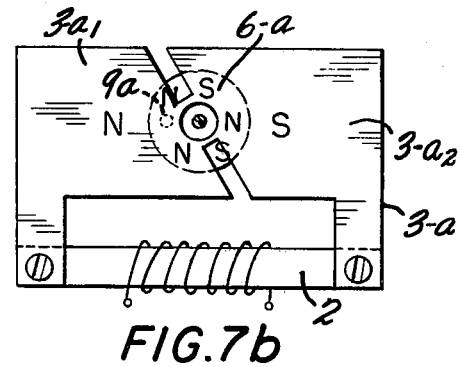

FIG. 7b shows the magnetized state of the upper stator pole pieces $3-a_1$ and $3-a_2$.

And FIG. 7b shows the state of the magnetic pole 6-a in the upper side of the rotor 6 when the current flows in the driving coil 2 in the direction of the arrow.

Figure 7C:
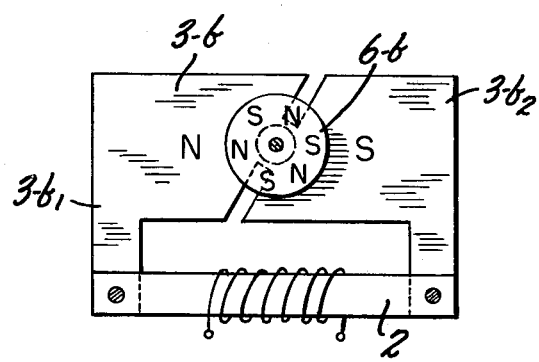

Also, FIG. 7c shows the magnetized state of the lower stator pole $3-b_1$ and $3-b_2$ and the state of the magnetic pole 6b in the lower side of the rotor 6 when the current flows at the driving coil 2 as shown in the arrow.

Herein, referring to the torque acting between the upper stator pole pieces $3-a_1$ and $3-a_2$ an the magnetic pole 6-a in the upper side of the rotor, the magnetic pole 6-a in the upper side of the rotor rests at the position as shown in FIG. 7b due to the magnetic piece 9a attached to the upper stator pole piece $3-a_1$.

At this time, the stator pole pieces $3-a_1$ and $3-a_2$ produce the magnetic pole polarity as shown in FIG. 7b.

Consequently, the torque between the upper stator 3-a and the magnetic pole in the upper side of the rotor acts clockwise.

Next, the arrangement of the magnetic poles is shown in FIG. 7c. Since the magnetic poles ot the rotor are magnetized in the axial direction of the rotor 6 from the magnetic pole 6-a of the rotor on the lower stator pole pieces $3-b_1$ and $3-b_2$, and since the gap line between the lower stator pole pieces $3-b_1$ and $3-b_2$ is at angle of 60° to the gap line between the upper stator pole pieces $3-a_1$ and $3-a_2$ in the case of a 12-pole rotor, the torque acts clockwise also.

After this time, the rotor 6 rotates clockwise again if the direction of the driving current which flows in the driving coil changes into the reverse direction.

As the result, the rotor 6 always rotates in the one direction upon flowing the reverse current to the driving coil 2 according to the rotation of the rotor 6.

Figure 8:
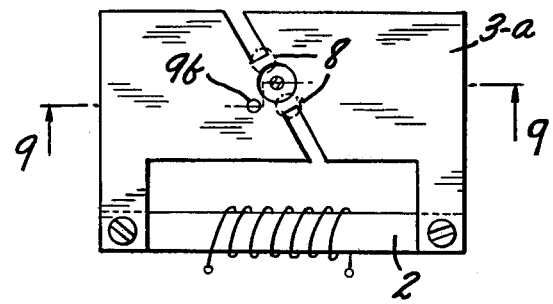
FIG. 8 is a plan view of another one-piece upper stator having a throughhole used for embodying this invention.
Figure 9:
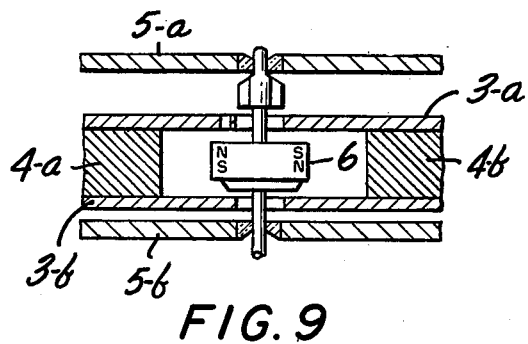
FIG. 9 is a cross-sectional view of the stepping motor using the one-piece upper stator as shown in FIG. 8.

Next, referring to FIG. 8 and FIG. 9, the upper stator 3-a has a throughhole 9b to determine the rest position of the rotor.

The rotor 6 rests at a position except the throughhole position in the one-piece upper stator 3-a having the higher magnetic potential energy because the rotor 6 rests in the position having the minimum total value of magnetic potential energy thereof when the driving current does not flow in the driving coil 2.

Accordingly, the position of the throughhole 9b is selected so that the rotor's magnetic pole rests at the optimum position to rotate.

FIG. 8 shows the upper stator 3-a which is constructed of one-piece material and has the throughhole 9b for determining the position of the rotor.

And the stator 3-a is designed to be saturated with little magnetomotive force of the driving coil at the position within the dotted line 8.

Consequently, the stator 3-a operates as a two-piece stator magnetically.

Figure 10:
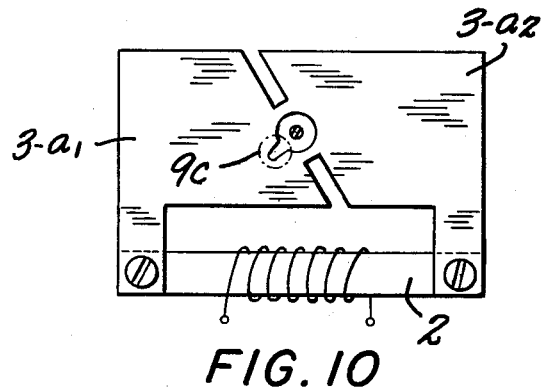
FIGS. 10 and 11 show the stator used for embodying this invention.

FIG. 10 shows another stator embodying this invention.

This stator $3-a_1$ has the recess portion 9c in the circumference composed of the stator pole piece $3-a_1$ and $3-a_2$ instead of the stator's throughhole as shown in FIG. 8 to determine the resting position of the rotor 6.

Therefore, the position of the rotor 6 is determined by the position of this recess portion 9c.

Figure 11:
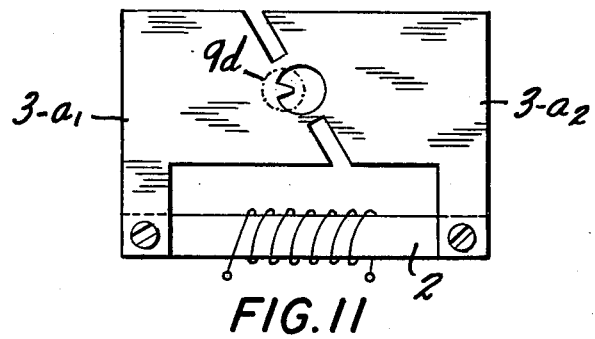

FIG. 11 shows another stator embodying this invention.

This stator 3 has the protruding portion 9d to attract the magnetic pole of the rotor instead of the stator's throughhole 9b as shown in FIG. 8 to determine the resting position of the rotor.

As mentioned above, the resting position of the rotor is easily determined and the assembling cost of the stepping motor is lowered in accordance with this invention.

And also, the stepping motor according to this invention has the effect that the maintenance thereof is easy since the upper and lower stators of this stepping motor consist of the one-piece material.

What is claimed is:

1. A stepping motor for a timepiece, comprising:
   a one-piece lower stator pair;
   a one-piece upper stator pair;
   magnetic material disposed between said lower and said upper stator pairs for magnetically connecting the same;
   a magnetic rotor disposed between said upper and lower stator pairs and having a plurality of magnetic poles circumferentially disposed around said rotor;
   means for magnetizing said upper and lower stator pairs to effectuate rotation of said rotor;
   and means for defining a rest position of said rotor when said upper and lower stator pairs are not magnetized.

2. A stepping motor for a timepiece according to claim 1, wherein said upper and lower stator pairs each comprise a single piece of material defining a pair of opposed stators connected by narrow segments sufficiently narrow to saturate magnetically with a low magnetomotive force when said stator pairs are magnetized, whereby said stator pairs magnetically behave as two-piece stators.

3. A stepping motor for a timepiece according to claim 1, wherein said means for defining a rest position of said rotor comprises a magnetic piece positioned opposite said rotor on one of said one-piece stator pairs.

4. A stepping motor for a timepiece according to claim 1, wherein said means for defining a rest position of said rotor comprises a hole through one of said one-piece stator pairs opposite said rotor.

5. A stepping motor for a timepiece according to claim 1, wherein one of said one-piece stator pairs includes a hole therethrough between a pair of said narrow segments with said rotor disposed opposite thereto, and said means for defining a rest position of said rotor comprises a recess or notch in the circumference of the hole.

6. A stepping motor for a timepiece according to claim 1, wherein said means for magnetizing said upper and lower stator pairs comprises a coil coupled with said stator pairs for receiving a current to magnetize said stator pairs.

* * * * *